_United States Patent_ [19]

Howard

[11] 4,187,204

[45] Feb. 5, 1980

[54] WATER-RESTRICTED, WATER-SOLUBLE PAINT

[75] Inventor: Jerald D. Howard, Upland, Calif.

[73] Assignee: Pactra Industries, Inc., Los Angeles, Calif.

[21] Appl. No.: 906,386

[22] Filed: May 16, 1978

Related U.S. Application Data

[62] Division of Ser. No. 807,109, Jun. 16, 1977, Pat. No. 4,125,499.

[51] Int. Cl.$^2$ .......................... C09D 3/58; C09D 3/64; C09D 3/74; C09D 5/02
[52] U.S. Cl. .................. 260/22 CB; 260/22 M; 260/29.2 E; 260/29.2 EP; 260/29.2 TN; 260/29.2 UA; 260/32.4; 260/32.6 R; 260/32.6 NR
[58] Field of Search .............. 260/22 M, 32.4, 32.6 R, 260/32.6 NR, 29.2 E, 29.2 EP, 29.2 TN, 29.2 UA, 22 CB

[56] References Cited

U.S. PATENT DOCUMENTS

| | | | |
|---|---|---|---|
| 2,647,094 | 7/1953 | Hahn | 260/23 S |
| 3,196,119 | 7/1965 | Boller et al. | 260/22 M |
| 3,301,808 | 1/1967 | Mack et al. | 260/886 |
| 3,343,718 | 9/1967 | Siegel et al. | 521/149 |
| 3,437,618 | 4/1969 | Taft | 260/22 M |
| 3,442,835 | 5/1969 | Curtice et al. | 260/22 M |
| 3,736,260 | 5/1973 | O'Sullivan et al. | 156/332 |
| 3,822,228 | 7/1974 | Petrella et al. | 260/17.4 CL |
| 3,867,323 | 2/1975 | Rifi | 260/32.6 R |
| 3,908,049 | 9/1975 | Fitko | 260/29.2 EP |
| 3,948,839 | 4/1976 | deVries | 260/32.6 R |
| 3,954,688 | 5/1976 | Hazan et al. | 204/181 T |
| 3,968,311 | 7/1976 | Hekal et al. | 428/461 |
| 3,984,364 | 10/1976 | Taub | 260/22 R |
| 4,035,332 | 7/1977 | Gomyo et al. | 260/32.6 R |
| 4,046,729 | 9/1977 | Scriven et al. | 204/181 C |
| 4,065,420 | 12/1977 | Lupinski et al. | 260/29.2 N |
| 4,071,514 | 1/1978 | Ribbecke et al. | 260/22 R |
| 4,075,145 | 2/1978 | Russell | 260/22 M |

OTHER PUBLICATIONS

Arolon Resins for Water-Thinned Coatings, Ashland Chemicals, 1976, pp. 1-31.

_Primary Examiner_—Ronald W. Griffin
_Attorney, Agent, or Firm_—Nilsson, Robbins, Dalgarn, Berliner, Carson & Wurst

[57] ABSTRACT

A paint composition which can be applied from a spray can yet which can be cleaned with water. The composition comprises a water-soluble, neutralized resin film former contained in a water-soluble solvent, but has a maximum water content of 10 weight percent. Formulations can be provided to obtain coatings ranging from flat to high gloss.

22 Claims, 1 Drawing Figure

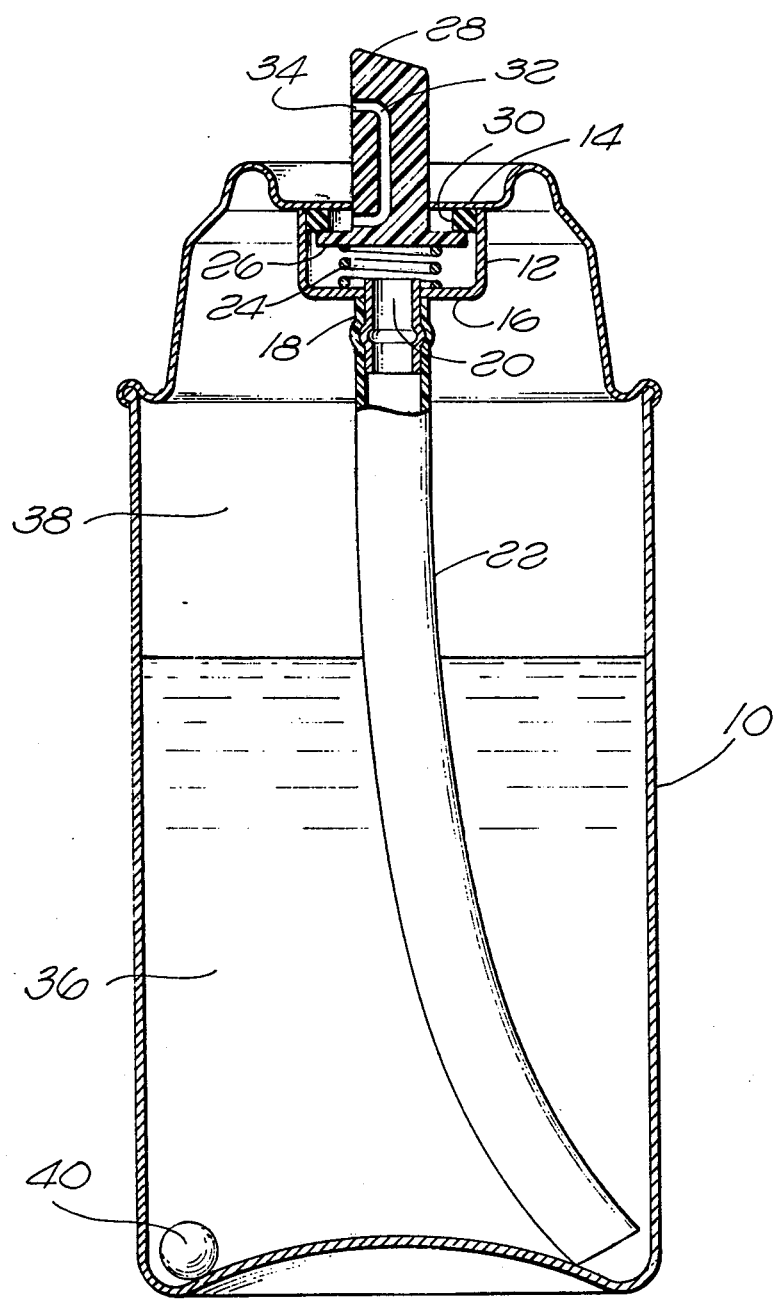

WATER-RESTRICTED, WATER-SOLUBLE PAINT

This is a division of application Ser. No. 807,109, filed June 16, 1977, now U.S. Pat. No. 4,125,499, issued Nov. 14, 1978.

FIELD OF THE INVENTION

The field of art to which the invention pertains includes the field of paint formulations, particularly sprayable coating compositions.

BACKGROUND AND SUMMARY OF THE INVENTION

Water-base paints have become very popular in recent years as a result of their ease of brush application and, of course, the tremendous advantages permitted by water-cleanup. Brushes can very easily be rinsed in water and the cleanup water can usually be disposed of in the local sewer system. Water-base paint formulations have been devised to dry rapidly with very little odor and to be water-resistant when dry. However, in spite of these advantages, heretofore there have been sufficient disadvantages in certain areas of application as to continue to require the use of oil-base paint. Thus, while there have been water-base paint formulations devised to yield somewhat of a semi-gloss coating, a full gloss coating has only been commercially achievable with paint having an oil base. Of equal significance is the fact that water-base paint cannot be satisfactorily dispensed in aerosol form. Accordingly, when both high-gloss and flat coatings are to be applied, the painter must use two systems of cleanup or else not use water-base paint. Applications requiring the efficiencies of spray painting have been necessarily limited to the use of oil-base paint with their consequent environmental disadvantages. In this regard, oil base paints used in aerosol spray cans often employ solvents which have in recent years been recognized as imposing severe environmental hazards, which solvents are increasingly being classified as "restricted" in air pollution control regulations. Additionally, certain of such solvents are now known to be hallucinogens, and are therefore health hazards. Additionally, water-base paints have to be carefully formulated to avoid can corrosion and stability problems.

The present invention eliminates the foregoing disadvantages by providing a paint formulation which can be dispensed in aerosol form, but which is water-receptive and which can be readily cleaned up with water. Formulations can be provided in accordance with this invention to obtain coatings ranging from flat to high gloss. Specifically, the formulations contain no water, or only minimal amounts of water, thereby eliminating can corrosion and stability problems, and permitting spraying from an aerosol can, yet the paint when applied can be cleaned up with water. After drying, the resultant coating is quite water resistant. Importantly, the foregoing environmental and health hazards are completely eliminated.

In particular, a paint composition is provided comprising a water-soluble, neutralized resin film former in a water-soluble solvent therefor. The film former is obtained by reaction of a resin containing carboxyl groups with an amine or ammonia as a basic neutralizer to form a salt. The resin contains sufficient carboxyl groups to be solubilized by the neutralizer as hereinafter described in more detail. Suitable resins for neutralizations are maleinized oils, oil modified alkyds, copolymer alkyds, oil-free alkyds, acrylic solutions, copolymer oils containing carboxyl groups, urethane polymers and epoxy esters. Significantly, the paint composition is formulated with no water or with only a minimal amount of water, more specifically with a maximum content of 8 weight percent. Pigment can be added to provide any desired color and in an amount sufficient to provide hiding power. Wetting agents and anti-settling agents can be used in conjunction with pigments to help disperse the pigments and maintain them in a dispersed state. Dryers can be added to accelerate oxidation of the coating to facilitate drying and slip additives can be added so to impart mar resistance to the dried coating. Anti-rust inhibitors can be added as desired as can perfumes. The formulations are characterized by a high gloss, but a flattening agent, such as silica, can be incorporated to provide a flat coating.

The paint formulations can be applied with a brush, but find their greatest advantage in being dispensed in aerosol form. In this regard, the usual aerosol-type system comprises a pressure-tight spray can having a valved opening and containing a liquid paint composition and a volatile propellant for spraying the liquid composition through the valve opening. The present invention improves upon that system by providing the above water-receptive paint formulation.

BRIEF DESCRIPTION OF THE DRAWINGS

The FIGURE shows a pressure-tight spray container for dispensing of the paint composition in aerosol form.

DETAILED DESCRIPTION

As required, detailed illustrative embodiments of the invention are disclosed herein. However, it is to be understood that these embodiments merely exemplify the invention which may take forms that are different from the specific illustrative embodiments disclosed. Therefore, specific details are not to be interpreted as necessarily limiting, but as basis for the claims which define the scope of the invention.

Referring to the FIGURE, the present invention finds its most advantageous use in being dispensed in aerosol form. To accomplish such dispensing, a pressure-tight spray can 10 of usual construction is provided. The can 10 incorporates a tubular shell 12 having an opened upper end mounted to the inside surface of the can top 14. The bottom wall 16 of the shell 12 is provided with a central nipple 18 depending from the wall 16 and defining a central aperture 20. A syphon tube 22 has its upper end forced over the nipple 18 and extends to a position at the bottom of the container 10. A coiled compression spring 24 is seated in the shell 12 and exerts a constant force against the bottom flange 26 of a floating valve 28 urging it upwardly toward sealing engagement with a gasket 30. The floating valve 28 is slidable within an opening in the top can wall 14 and is formed with a channel 32 leading from the shell 12 to a nozzle opening 34.

The spray can 10 contains a liquid mixture 36 of paint composition and aerosol fluid, a region 38 above the liquid mixture being saturated with aerosol gas. As known, a steel ball 40 is placed in the mixture to facilitate mixing of paint and aerosol fluid. In accordance with usual practice, upon depressing of the valve 28, the channel 32 is opened to the outside. The mixture 36 of paint and aerosol fluid is forced by pressure inside the can through the channel 32 and out of the nozzle 34. As the aerosol fluid in the mixture reaches the atmosphere, it bursts into a gas turning the paint composition into a fine spray.

The foregoing is quite well known in mechanical structure and operation and relies for novelty on the fact that the particular compositions provided herein have not heretofore been applied to an aerosol spray type can. Rather, the type of compositions provided herein have invariably been utilized in conjunction with a substantial amount of water as water-base paints. As such they have not been sprayable from the type of structure above-described.

In a broader statement of the present invention, the paint compositions per se are novel and can be used with a brush as well as in aerosol spray form. Paint compositions useful in the present invention have the following ingredients stated in percentage by weight:

| water-soluble, neutralized resin | 5–60% |
|---|---|
| water-soluble solvent | 35–95% |
| pigment | 0–40% |
| dryer | 0.05–1.5% |
| slip additive | 0.02–5.0% |
| wetting agent | 0–4.0% |
| anti-settling agent | 0–4.0% |
| rust inhibitor | 0–20.0% |
| flattening agent | 0–20.0% |
| water | 0–8.0% |

As indicated in the above listing of ingredients, a large number of the components are not required. Although the formulation is shown with minimum amounts of dryer and slip additive, these components are not critical to the formulation, but they operate in known manner to provide known functions, as hereinafter described, in the ranges indicated. Additionally, somewhat different ranges can be used for the dryer and slip additive as well as for the optional components, other than water, the ranges given being those that are found to be most usually operative to yield a satisfactory coating. The amount stated for pigment content covers both brush and aerosol applications. For aerosol applications, a lower range of 0–20% is preferable. A small amount of water insoluble solvent can be tolerated.

It is preferable to eliminate entirely the presence of water, as it performs no useful function in the formulation, but rather presents some source of can corrosion and instability. Nevertheless, it is included in the range given simply to indicate that a small amount of water can be tolerated with the above formulation without seriously detracting from the significant advantages of the present invention. These advantages lie in the fact that the composition is water-soluble and accepts water for cleanup purposes, but does not require water in its application. In this regard, as will be demonstrated hereinafter, up to 5 weight percent water can be tolerated without significant detraction from sprayability properties, but properties which are acceptable under less rigid criteria are obtained with as much as 8 weight percent water as referred to in the above listing of ingredients.

The neutralized resin is a water-soluble, neutralized resin film former obtained by reaction of resin containing carboxyl groups and amine or ammonia as a basic neutralizer therefor. The resin contains sufficient carboxyl groups to form a water-soluble salt by the reaction. The carboxyl group-containing resin can be any of a wide variety of such resins and numerous types are commercially available. Specific examples of such commercial resins are alkyd resins, acrylic solutions, urethane polymers, epoxy ester resins, maleinized oils and copolymer oils containing carboxyl groups. The alkyds can be provided as oil modified alkyds, copolymer alkyds or oil-free alkyds.

Amine or ammonia neutralization of carboxyl-containing resins is well known to form water-soluble type resins. The neutralizing amine may affect stability, film discoloration, film defects, gloss, foam, viscosity reduction and cost, and therefore the particular amine utilized will depend upon the goal to be achieved with the particular paint composition. Examples of neutralizers that can be used include: ammonia (usually as a 28% water solution), triethylamine, 2-dimethylamino-2-methyl-1-propanol, trimethylamine, N,N-diethanolamine, triethanolamine, 2-amino-2-methyl-1-propanol, methylamine, ethylamine, N,N-dimethylethanolamine, diethanolamine, morpholine, monoethanolamine, aminomethyl propanol and diethylamine.

The amount of amine required to solubilize an unneutralized resin can be calculated from the acid value (acid number) of the resin. In turn, the acid value may be defined as milligrams of KOH per gram of resin solid required to give a phenophthalien titration end point. The acid value can be readily determined by simple experimentation and the following formula used to determine the amount of amine required for 100% neutralization:

$$\text{wt. of amine} = \frac{(\text{mol. wt. amine}) \times (\text{acid value of resin solid}) \times (\text{wt. resin solid})}{56{,}110}$$

Thus, the neutralization amount of amine can be calculated by multipying the molecular weight of the amine times the acid value of the resin solid times the weight of the resin solid, divided by 56,110 (which is 1000 times the molecular weight of KOH). The weight of amine thus found is the theoretical neutralization requirement of the resin. As a practical matter, one can obtain sufficient neutralization to yield water solubility with as low as 60% of the theoretical requirement of that resin. Accordingly, one can obtain a water-soluble, neutralized resin film former by using an amount of neutralizer which is equal to at least 60% of the theoretical requirement of the resin. In this regard, it will be appreciated that the phrase "neutralized resin" does not refer to 100% neutralization or theoretical neutralization, but only sufficient neturalization to achieve water solubility.

The resin neutralizing reaction is achieved by dissolving the resin and amine neutralizer in a water-soluble solvent. Examples of such solvents include water-soluble alcohol, ketones, acetates or glycol ethers. Specific examples include ethanol, isopropanol, n-propanol, n-butanol, acetone, diethylketone, dimethylformamide, 2-nitropropane, ethylene glycol monomethyl ether, ethylene glycol monoethyl ether, ethylene glycol mono n-butyl ether, propylene glycol methyl ether, and ethylene glycol monomethyl ether acetate.

Pigments are added as known to provide color and cover. Any of the usual inorganic or organic pigments can be used. In this regard, the word pigment is used in its broader sense to include not only organic and inorganic colorants but also metallic powders. The following lists various pigments under generic type, all of which are available commercially. REDS: toluidine red, parachloro nitro aniline, quinacridone red, anthroquinoid red, naphthol red, cadmium, barium lithol, lithol rubines, pyrozolone, perylene, red lead; YELLOWS: hansa, iron oxide, ferrites, lead chromates, toluidine yellow, nickel titanate, green gold, benzidine, cadmium, zinc yellow, basic zinc chromate, strontium yellow, litharge, diarylide yellow; ORANGES: dinitro, molybdate, diaryl; BROWNS: sienna, umber, iron oxide (syn), metallic browns, hydrated iron oxide; GREENS: chromium oxide phthalocyanine green, pigment green B, chrome greens, phthalochrome; BLUE AND VIOLET: phthalo cyanine blue, ultramarine blue, methyl violet blue, carbizole blue; WHITES: titanium dioxide, extended titanium dioxide, lithopone zinc sulfide, basic silicate white lead, basic sulfate white lead; barium metabarate; BLACKS: channel, furnace, bone black, analine; METALLICS: aluminum powder, gold bronze powder.

With the use of pigments, it may be desirable to use a wetting agent for dispersion of the pigment alone or in conjunction with an anti-settling agent. Such agents are well known to the art and specific illustrations will be given below in the examples.

In addition to the foregoing formulation ingredients, it is desirable to add a dryer which serves to accelerate oxidation of the coating for rapid drying. A slip additive can also be incorporated to improve the tar resistance of the dried coating. In other certain specific formulations, a rust inhibitor can be added. Illustrations of specific driers, slip additives and rust inhibitors will be given in the examples.

A characterizing advantage of the foregoing formulations is that they provide a paint coating which can be cleaned up with water and yet yields a finish which is highly glossy. When it is desired to reduce the gloss, or to obtain a flat finish, one can add a flattener such as silica, aluminum stearate, magnesium silicate, aluminum silicate, mica, calcium carbonate, or the like.

The paint can be applied directly with a brush but, as previously indicated, its greatest advantage occurs when dispensed in aerosol form from a spray type can. As is well known, a propellant can be charged into a pressure-tight can containing the paint composition to achieve a pressure in the can in the range of about 20-75 p.s.i.g. The propellant may be formed on one or more appropriate compounds so that the combination has the desired vapor pressure. The art and technique for pressurizing spray cans is of course well established. A propellant combination is used which is liquid under the pressure conditions within the can, but which rapidly becomes a gas upon being exposed to atmospheric pressure. Propellants that can be used include: aliphatic hydrocarbons, such as blends of methane, ethane, propane, n-butane and isobutane; halogenated fluorocarbons and chlorocarbons, such as dichlorodifluoromethane, chlorodifluoromethane, fluorotetrachloromethane, methylene chloride and the like; ethers such as dimethyl ether, methylethyl ether, diethylethyl ether; compressible gases such as carbon dioxide, nitrous oxide, nitrogen and the like; cyclic hydrocarbons such as cyclopropane; and various other known propellant materials such as butadiene, butylene, carbon dioxide, ethylene chloride, propylene oxide, propylene, vinyl chloride, and the like.

Regardless of the manner of use, paint coatings resulting from practice of the present invention can be cleaned up with water until it is dried. For example, the paint can usually be cleaned up with water during the first ten minutes after application. After that, for the next 15 minutes, cleanup may require the use of soap and water. Thereafter, the paint is water resistant. Accordingly, one can paint surfaces with the ease of spray painting and clean up as through it were a water-base paint, yet have a coating which dries rapidly to achieve any degree of glossiness desired in accordance with the formulation used.

In preparing the various paint formulations illustrated by examples which will follow, any method for mixing the materials will be satisfactory, but certain procedures will facilitate preparation of the formulations. In this regard, simply from the point of view of handling bulky volumes, it will be desirable to divide the resin and solvent into two or more parts and separately mix the parts with the amine or ammonia neutralizer to form the neutralized resin. The fractional portions can then be combined to obtain the final product. The following examples will illustrate various formulations.

EXAMPLES 1-3

For purposes of comparison of the effect of water, clear paint compositions were prepared using the ingredients listed in the amounts by percentage weight indicated below:

|  | Ex. 1 | Ex. 3 | Ex. 3 |
|---|---|---|---|
| Aquamac 1200 | 23.29% | 23.29% | 23.29% |
| Kelsol 3902 | 11.71 | 11.71 | 11.71 |
| ethylene glycol n-butyl ether | 5.12 | 5.12 | 5.12 |
| propylene glycol methyl ether | 5.12 | 5.12 | 5.12 |
| triethylamine | 1.62 | 1.62 | 1.62 |
| acetone | 47.38 | 42.53 | 37.70 |
| Byk 301 | 0.40 | 0.40 | 0.40 |
| 6% cobalt naphthenate | 0.40 | 0.40 | 0.40 |
| Activ 8 | 0.12 | 0.12 | 0.12 |
| water | 4.84 | 9.69 | 14.52 |
|  | 100.00% | 100.00% | 100.00% |

The Aquamac 1200 is a urethane resin obtained from International Minerals and Chemical Corporation. Kelsol 3902 is an alkyd resin obtained from the Spencer Kellogg Company. The ethylene glycol n-butyl ether, propylene glycol ether and acetone are water-soluble solvents, and the trietheylamine is a neturalizer for the resin. Byk 301 is a slip additive obtained from Byk Mallinckrodt Co. The 6% solution of cobalt naphthenate is a drier and Activ 8 in a drier obtained from R. T. Vanderbilt Co. Water is present in the solutions to illustrate the effect of the various levels on sprayability of the composition and these effects will be described further below.

In preparing the foregoing formulations, the Kelsol 3902 can be dissolved in the ethylene glycol n-butyl ether and propylene glycol methyl ether and reacted with about one half of the triethylamine. In a separate vessel, the Aquamac 1200 can be dissolved in the acetone and reacted with the remaining portion of the triethylamine. The contents of the two vessels can then be combined and the remaining ingredients can then be added. The result in each case is a clear paint.

Effect of Water

In order to demonstrate the effect of the water content on sprayability, each paint composition was placed in a loadable spray can along with half its volume of methylene chloride. A valve was inserted and each spray can was pressurized with a hydrocarbon propellant consisting of an equal volume mixture of propane and isobutane, until an initial pressure of 45 p.s.i.g. was obtained. Under these conditions, amounts of hydrocarbon propellant approximately equal to the methylene chloride were charged to the spray cans. The methylene chloride, although liquid, also acts as a propellant in this mixture. By such means, spray cans containing paint compositions of Examples 1, 2 and 3 were obtained. Upon spraying of a metal panel, application of the composition of Example 1 was found to be excellent with no foam. Application of the composition of Example 2 was found to be from fair to good with some foam but an acceptable level for most applications. Application of the composition of Example 3 was found to be very poor with an unacceptable level of foam.

EXAMPLE 4

A water-soluble, clear aerosol paint composition was formulated using the following ingredients:

| | |
|---|---|
| Cargil 7415 | 26.43% |
| ethylene glycol n-butyl ether | 13.21 |
| n-propanol | 11.80 |
| dimethyl ketone | 46.51 |
| Byk 301 | 0.30 |
| 6% zirconium (as an oil dispersion) | 0.30 |
| 28% ammonium hydroxide | 1.45 |
| | 100.00% |

Cargil 7415 is an acrylic alkyd obtained from Cargil Incorporated. n-Propanol and dimethyl ketone are solvents. The 6% zirconium dispersion is a drier and the ammonium hydroxide is a source of ammonia (28% in water).

EXAMPLE 5

A water soluble, blue aerosol paint composition was formulated using the following ingredients:

| | |
|---|---|
| Aquamac 1200 | 28.34% |
| titanium dioxide | 1.99 |
| phthalocyanine blue | 1.99 |
| ethylene glycol monomethyl ether acetate | 9.54 |
| acetone | 55.89 |
| Byk 301 | 0.40 |
| 12% Cobalt Nuxtra | 0.17 |
| Activ-8 | 0.11 |
| triethylamine | 1.57 |
| | 100.00% |

Titanium dioxide and phthalocyanine blue are pigments. Ethylene glycol monomethyl ether acetate is a solvent. The 12% Cobalt Nuxtra is a drier obtained from Tenneco Chemical Co.

EXAMPLE 6

A water-soluble, green aerosol paint composition was formulated using the following ingredients:

| | |
|---|---|
| Kelsol 3902 | 11.34% |
| Aquamac 1200 | 22.56 |
| propylene glycol methyl ether | 9.91 |
| phthalocyanine green | 1.83 |
| diarylide yellow | 0.26 |
| titanium dioxide | 1.30 |
| Ea 1075 | 0.52 |
| Disperbyk | 0.13 |
| acetone | 49.29 |
| Byk 301 | 0.39 |
| 6% cobalt naphthenate | 0.39 |
| Activ-8 | 0.12 |
| Triethylamine | 1.96 |
| | 100.00% |

Propylene glycol methyl ether is a solvent. Phthalocyanine green and diarylide yellow are pigments. EA 1075 is an anti-settling agent obtained from NL Industries. Disperbyk is a wetting agent obtained from Byk Mallinckrodt Co.

EXAMPLE 7

A water-soluble, aluminum aerosol paint composition was formulated using the following ingredients:

| | |
|---|---|
| Kelsol 3900 | 25.73% |
| aluminum powder | 12.86 |
| ethylene glycol n-butyl ether | 4.81 |
| n-propanol | 12.91 |
| acetone | 41.42 |
| Byk 301 | 0.38 |
| 12% Cobalt Nuxtra | 0.15 |
| Activ-8 | 0.10 |
| triethylamine | 1.64 |
| | 100.00% |

The aluminum powder served as pigment imparting the aluminum paint color.

EXAMPLE 8

A water-soluble, gold aerosol paint composition was formulated using the following ingredients:

| | |
|---|---|
| Kelsol 3902 | 11.15% |
| Aquamac 1200 | 22.17 |
| gold bronze powder | 6.26 |
| ethylene glycol n-butyl ether | 9.61 |
| acetone | 47.41 |
| Byk 301 | 0.38 |
| 12% cobalt naphthenate | 0.19 |
| Activ-8 | 0.11 |
| triethylamine | 2.70 |
| | 100.00% |

The gold bronze powder served as pigment imparting the gold paint color.

EXAMPLE 9

A water-soluble, white aerosol paint composition was formulated using the following ingredients:

| | |
|---|---|
| Arolon 557-D-70 | 24.77% |
| titanium dioxide | 17.37 |
| ethylene glycol n-butyl ether | 8.68 |
| n-propanol | 7.76 |
| acetone | 37.86 |
| 6% cobalt naphthenate | 0.09 |
| Activ-8 | 0.06 |
| Byk 301 | 0.30 |
| 2-dimethylamino-2-methyl-1-propanol | 3.11 |
| | 100.00% |

Arolon 557-D-70 is an acrylic solution obtained from Ashland Chemical Company. 2-Dimethylamino-2-methyl-1-propanol serves as a neutralizer.

EXAMPLE 10

A water-soluble, red aerosol paint composition was formulated using the following ingredients:

| | |
|---|---|
| Epotuf 38-690 | 27.38% |
| naphthol red | 3.35 |
| titanium dioxide | 0.67 |
| ethylene glycol n-butyl ether | 10.06 |
| n-propanol | 8.99 |
| acetone | 47.77 |
| Byk 301 | 0.13 |
| 6% cobalt naphthenate | 0.08 |
| 6% zirconium (as an oil dispersion) | 0.08 |
| 28% ammonium hydroxide | 1.49 |
| | 100.00% |

Epotuf 38-690 is an epoxy ester resin obtained from Reichhold Chemicals Inc. Naphthol red served as a pigment to impart the red paint color.

EXAMPLE 11

A water-soluble, yellow aerosol paint composition was formulated using the following ingredients:

| | |
|---|---|
| Kelsol 3902 | 17.27% |
| Epotuf 38-690 | 6.26 |
| toluidine yellow | 2.55 |
| titanium dioxide | 2.55 |
| ethylene glycol n-butyl ether | 7.53 |
| n-propanol | 7.77 |
| acetone | 42.30 |
| Byk 301 | 2.90 |
| 6% cobalt naphthenate | 0.09 |
| Activ 8 | 0.06 |
| triethylamine | 10.72 |
| | 100.00% |

The toluidine yellow served as a pigment imparting the yellow paint color.

In the foregoing examples, the paint formulations obtained are particularly suitable for use as aerosol paints and yield enamel coatings having high gloss. Example 12 below illustrates a formulation also suitable for spraying as an aerosol paint, but which yields a flat coating.

EXAMPLE 12

A water-soluble flat, clear aerosol paint composition was formulated using the following ingredients:

| | |
|---|---|
| Aquamac 1200 | 22.13% |
| Kelsol 3902 | 11.13 |
| silica | 4.99 |
| ethylene glycol n-butyl ether | 9.72 |
| triethylamine | 1.53 |
| acetone | 49.63 |
| Byk 301 (slip additive) | 0.38 |
| 6% cobalt naphthenate (drier) | 0.38 |
| Activ 8 (drier) | 0.11 |
| | 100.00% |

The silica serves as a flattening agent.

EXAMPLES 13–15

Water-soluble, red aerosol paint compositions having rust inhibitive properties were formulated using the following ingredients:

| | Ex. 13 | Ex. 14 | Ex. 15 |
|---|---|---|---|
| Aquamac 1200 | 21.75% | 21.75% | 21.75% |
| Kelsol 3902 | 10.94 | 10.94 | 10.94 |
| naphthol red | 2.51 | 2.51 | 2.51 |
| red iron oxide | 0.75 | 0.75 | 0.75 |
| Bykumen | 0.05 | 0.05 | 0.05 |
| EA 1075 | 0.75 | 0.75 | 0.75 |
| ethylene glycol n-butyl ether | 4.78 | 4.78 | 4.78 |
| propylene glycol methyl ether | 4.78 | 4.78 | 4.78 |
| acetone | 44.70 | 44.70 | 44.70 |
| Byk 301 (slip additive) | 0.38 | 0.38 | 0.38 |
| 6% cobalt naphthenate (drier) | 0.38 | 0.38 | 0.38 |
| Activ 8 (drier) | 0.11 | 0.11 | 0.11 |
| basic zinc molybdate | 6.23 | — | — |
| basic calcium zinc molybdate | — | 6.23 | — |
| zinc phosphate | — | — | 6.23 |
| triethylamine | 1.89 | 1.89 | |
| | 100.00% | 100.00% | 100.00% |

The naphthol red and red iron oxide served as pigment imparting the red paint color. Bykumen is a wetting agent obtained from Byk Mallinckrodt Co. Rust inhibitive properties were obtained using an anti-rust pigment which in Example 13 was basic zinc molybdate, in Example 14, basic calcium zinc molybdate, and in Example 16, zinc phosphate.

EXAMPLES 16 AND 17

Water-soluble, red aerosol paint compositions having rust inhibitive properties were formulated using the following ingredients:

| | Ex. 16 | Ex. 17 |
|---|---|---|
| Aquamac 1200 | 22.55% | 22.48% |
| Kelsol 3902 | 11.34 | 11.31 |
| ethylene glycol n-butyl ether | 4.95 | 4.93 |
| propylene glycol methyl ether | 4.95 | 4.93 |
| Bykumen | 0.02 | 0.03 |
| BA 1075 | 0.52 | 0.52 |
| titanium dioxide | 0.65 | 0.64 |
| napthol red | 2.61 | 2.59 |
| triethylamine | 1.56 | 1.56 |
| acetone | 49.61 | 49.81 |
| Byk 301 (slip additive) | 0.26 | 0.26 |
| 6% cobalt naphthenate (drier) | 0.43 | 0.39 |
| tolytriazole | 0.55 | — |
| Benzotriazole | — | 0.55 |
| | 100.00% | 100.00% |

Rust inhibitive properties were obtained using organic rust inhibitors which in Example 16 ws tolyltriazole and in Example 17 was benzotriazole.

The following examples illustrate formulations which are particularly suitable for paint to be brushed on rather than sprayed through an aerosol.

EXAMPLE 18

A water-soluble, white brushing enamel paint composition was formulated using the following ingredients:

| | |
|---|---|
| Kelsol 3902 | 33.63% |
| titanium dioxide | 25.25 |
| ethylene glycol n-butyl ether | 7.57 |
| n-butanol | 30.40 |
| Byk 301 | 0.40 |
| 12% cobalt naphthenate | 0.20 |

| Activ 8 | 0.12 |
| triethylamine | 2.43 |
| | 100.00% |

The n-butanol serves as a solvent.

EXAMPLE 19

A water-soluble, white brushing enamel paint composition was formulated using the following ingredients:

| Aquamac 1200 | 31.94% |
| ethylene glycol n-butyl ether | 5.95 |
| propylene glycol methyl ether | 37.99 |
| n-butanol | 1.98 |
| titanium dioxide | 19.84 |
| Byk 300 | 0.06 |
| 12% zirconium (as an oil dispersion) | 0.05 |
| 6% cobalt naphthenate | 0.19 |
| triethylamine | 2.00 |
| | 100.00% |

EXAMPLE 20

A water-soluble, white brushing enamel paint composition was formulated using the following compositions:

| Aquamac 1200 | 31.94% |
| ethylene glycol n-butyl ether | 6.21 |
| propylene glycol methyl ether | 33.99 |
| n-butanol | 1.97 |
| 12% zirconium (as an oil dispersion) | 0.04 |
| 6% cobalt naphthenate | 0.20 |
| titanium dioxide | 19.70 |
| Byk 300 | 0.59 |
| triethylamine | 2.27 |
| water | 3.31 |
| | 100.00% |

I claim:

1. A water soluble paint composition capable of direct application to a surface for forming a dried coating of paint, comprising:
   from 5 to 60 weight percent of a water soluble, neutralized resin film former obtained by reaction of (a) resin containing sufficient carboxyl groups to be water solubilized by reaction with a basic neutralizer to form a salt thereof, said resin being selected from maleinized oils, oil modified alkyds, copolymer alkyds, oil free alkyds, acrylic solutions, copolymer oils, epoxy esters and urethane polymers, and (b) an amine or ammonia as said basic neutralizer for forming said salt with said resin, the amount of said neutralizer reacted with said resin to water-solubilize said resin being equal to at least 60% of the theoretical neutralization requirement of said resin; and
   from 35 to 95 weight percent of a solvent for said neutralized resin comprising a water-soluble solvent;
   said paint composition having a maximum of 8 weight percent water.

2. The composition of claim 1 including pigment dispersed or dissolved therein.

3. The composition of claim 1 or 2 including a flattening agent.

4. The composition of claim 3 in which said flattening agent comprises silica.

5. The composition of claim 1 in which said neutralized resin and said solvent together constitute the major components in weight percentage of said composition.

6. The composition of claim 5 including up to 40 weight percent pigment dispersed or dissolved in said composition.

7. The composition of claim 1 having the following ingredients in the percentage by weight amount indicated:

| said neutralized resin | 5-60% |
| said solvent | 35-95% |
| pigment | 0-40% |
| drying agents | 0.05-1.5% |
| slip additive | 0.02-5.0% |
| flattening agent | 0-20.0% |
| anti-settling agent | 0-4.0% |
| wetting agent | 0-4.0% |
| rust inhibitor | 0-20.0% |
| water | 0-8.0% |

8. A method of painting a surface, comprising:
   forming a water soluble paint composition comprising from 5 to 60 weight percent of a water soluble, neutralized resin film former in from 35 to 95 weight percent of a water-soluble solvent therefor including the step of reacting (a) resin containing sufficient carboxyl groups to be water solubilized by reaction with a basic neutralizer to form a salt thereof, and (b) an amine or ammonia as said basic neutralizer for forming said salt with said resin, the amount of said neutralizer reacted with said resin to water solubilize said resin being equal to at least 60% of the theoretical neutralization requirement of said resin, said paint composition having a maximum of 8 weight percent water;
   obtaining a dried coating of said paint composition by the step consisting essentially of applying said paint composition onto said surface without increasing its water content.

9. The method of claim 8 in which the step of applying said paint composition comprises incorporating said paint composition along with a volatile propellant therefor in a pressure-tight spray can having a valve opening, and spraying said paint composition onto said surface.

10. The method of claim 8 in which said paint composition includes pigment dispersed or dissolved therein.

11. The method of claim 8, 9 or 10 in which said resin is selected from maleinized oils, oil modified alkyds, copolymer alkyds, oil free alkyds, acrylic solutions, copolymer oils, epoxy esters and urethane polymers.

12. The method of claim 8, 9 or 10 in which said paint composition includes flattening agent.

13. The method of claim 12 in which said flattening agent comprises silica.

14. The method of claim 8 or 9 in which said neutralized resin and said solvent together constitute the major components in weight percentage of said paint composition.

15. The method of claim 14 in which said paint composition includes up to 40 weight percent pigment.

16. The method of claim 8 in which said paint composition has the following ingredients in the percentage by weight amount indicated:

| | |
|---|---|
| said neutralized resin | 5–60% |
| said solvent | 35–95% |
| pigment | 0–40% |
| drying agents | 0.05–1.5% |
| slip additive | 0.02–5.0% |
| flattening agent | 0–20.0% |
| anti-settling agent | 0–4.0% |
| wetting agent | 0–4.0% |
| rust inhibitor | 0–20.0% |
| water | 0–8.0% |

17. The method of claim 16 in which said paint composition contains 0–20 weight percent of said pigment, and in which the step of applying said paint composition comprises incorporating said paint composition along with a volatile propellant therefor in a pressure-tight spray can having a valve opening, and spraying said paint composition onto said surface.

18. The method of claim 8 or 16 in which said paint composition is applied by brushing said composition onto a surface without increasing its water content.

19. The composition of claim 1 or 7 having a maximum of 5 weight percent of water.

20. The method of claim 8 or 16 in which said paint composition has a maximum of 5 weight percent of water.

21. A water soluble paint composition capable of direct application to a surface for forming a dried coating of paint, comprising:
   from 5 to 60 weight percent of a water soluble, neutralized resin film former obtained by reaction of (a) resin containing sufficient carboxyl groups to be water solubilized by reaction with a basic neutralizer to form a salt thereof, and (b) an amine or ammonia as said basic neutralizer for forming said salt with said resin, the amount of said neutralizer reacted with said resin to water-solubilize said resin being equal to at least 60% of the theoretical neutralization requirement of said resin; and
   from 35 to 95 weight percent of a solvent for said neutralized resin comprising a water-soluble solvent;
   said paint composition including pigment dispersed or dissolved therein and having a maximum of 8 weight percent of water.

22. The composition of claim 21 in which said solvent is selected from water-soluble alcohols, ketones, acetates and glycol ethers.

* * * * *

UNITED STATES PATENT AND TRADEMARK OFFICE
CERTIFICATE OF CORRECTION

PATENT NO. : 4,187,204
DATED : February 5, 1980
INVENTOR(S) : Jerald D. Howard

It is certified that error appears in the above-identified patent and that said Letters Patent are hereby corrected as shown below:

Column 5, line 27, delete "tar" and substitute therefor --mar--.

Column 5, line 45, delete "on" and substitute therefor --of--.

Column 6, line 28, after "Ex. 1", delete "Ex. 3" and substitute therefor --Ex. 2--.

Column 10, line 19, after "1.89", second occurrence, add --1.89--.

Column 10, line 43, delete "BA 1075" and substitute therefor --EA 1075--.

Column 10, line 48, delete "tolytriazole" and substitute therefor --tolyltriazole--.

Signed and Sealed this

First Day of July 1980

[SEAL]

Attest:

SIDNEY A. DIAMOND

Attesting Officer

Commissioner of Patents and Trademarks